Feb. 27, 1962 H. T. PETERSEN 3,022,801
VALVE-TRAVERSING PIPE STOPPER ASSEMBLY
Filed June 24, 1957
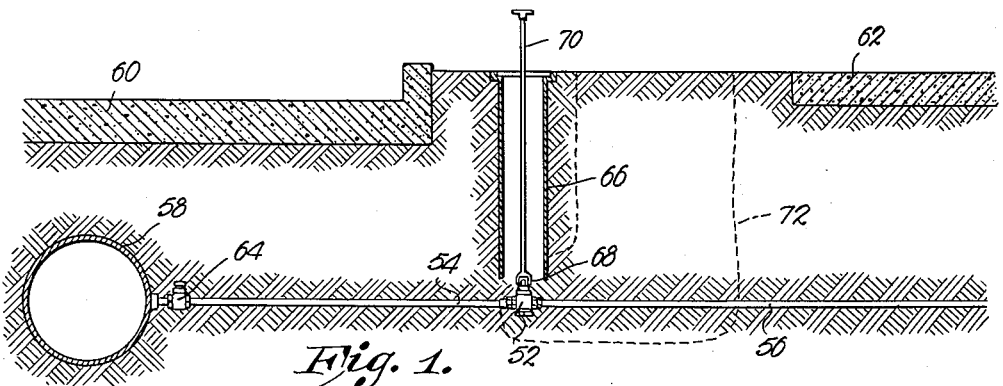
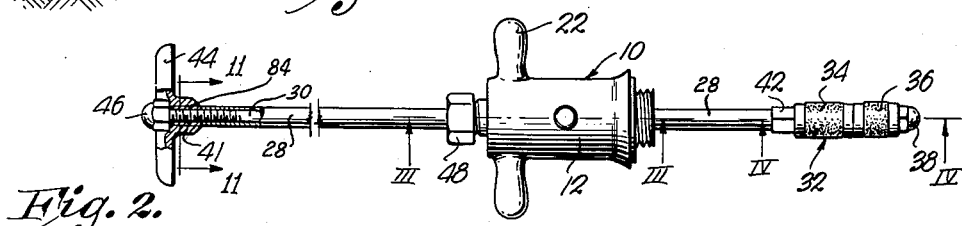
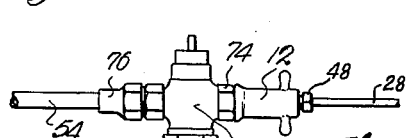
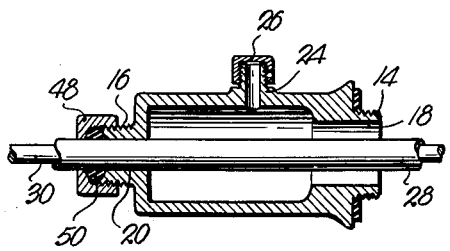
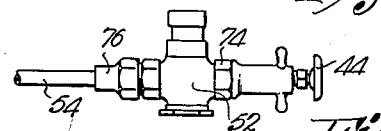
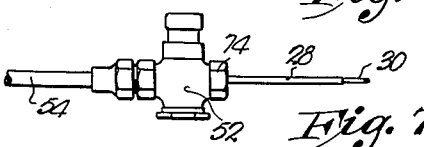
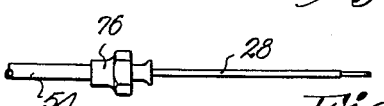
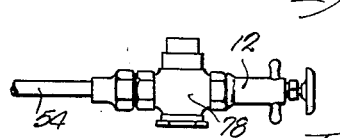
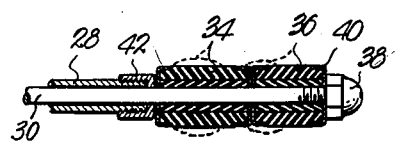
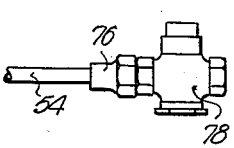
INVENTOR.
Henry T. Petersen
BY
ATTORNEY.

United States Patent Office 3,022,801
Patented Feb. 27, 1962

3,022,801
VALVE-TRAVERSING PIPE STOPPER ASSEMBLY
Henry T. Petersen, 349 Woodland Road, Riverside, Mo.
Filed June 24, 1957, Ser. No. 667,449
1 Claim. (Cl. 138—89)

This invention relates to apparatus which is especially adapted for permitting removal and replacement of a fluid valve stop connected to an inlet line maintained under pressure, and to a method of replacing valve stops from pressurized lines without substantial loss of fluid therefrom.

Although applicable to all types of valve stops connected to pressurized fluid lines, the present invention is particularly adapted for facilitating removal and replacement of those valve stops which are connected to a water line which leads from a corporation supply conduit located in the roadway to the user's location.

Replacement of the curb valve stops has presented peculiar problems because of the usual necessity of digging up the roadway to close the corporation stop in order to prevent excessive loss of water during replacement of the curb stop and thus making the whole operation extremely expensive and time consuming.

It is, therefore, the most important object of this invention to provide apparatus for facilitating removal and replacement of a fluid valve stop which is connected to a pressurized fluid inlet line without substantial loss of fluid during the replacement operation.

A further important object of this invention is to provide apparatus which includes an expansible stopper connected to an elongated element in a manner so that the stopper may be moved through the valve and into the end of the inlet line connected to the valve stop upon shifting of the elongated element in that direction, whereby the stopper may be expanded to a position blocking the inlet line and permit removal and replacement of the valve stop without substantial fluid loss.

An equally important object of this invention is to provide an elongated, tubular body which is adapted to be mounted on the outlet end of the valve stop to be replaced and which reciprocably carries an elongated element having the expansible stopper on one end thereof, and which may be moved into the pressurized inlet line upon reciprocation of the elongated element, whereby the stopper may be expanded from a position externally of the valve stop to block flow of fluid through the inlet line.

An additional important object of this invention is to provide valve-traversing pipe stopper structure wherein the stopper includes a pair of spaced, elongated, flexible tubular elements which are longitudinally compressible into an expanded position so that upon expansion of the members within the inlet line, flow of fluid therethrough is effectively blocked.

A further important object of this invention is to provide a method for removing and replacing a fluid valve stop connected to an inlet line maintained under pressure, wherein flow of fluid through the inlet line connected to the valve stop may be effectively checked during replacement of the valve stop and thereby prevent loss of fluid during the valve changing operation.

Other important objects of the instant invention relate to the provision of a pair of elongated, expandable members forming the stopper which are of differing lengths, so that the members expand at variable rates and thereby engage the innermost surface of the inlet line at different times; to the provision of said pair of members, which gives a double orifice type resistance to fluid pressures exerted thereon; to the provision of a tubular element over the elongated rod upon which the tubular stopper members are disposed in a position so that upon reciprocation of the rod with respect to the element, the flexible members are longitudinally compressed to expand the same; to the provision of means on the opposite end of the rod to effect reciprocation of the rod with respect to the tubular element; to the provision of such means for effecting reciprocation of the rod with respect to the element which is removable to thereby allow the valve stop to be removed from the inlet line over the rod and tubular member; to means on the body carrying the stopper assembly for determining whether the stopper is effectively blocking flow of fluid from the inlet line; and other details and objects which will become obvious or be explained more fully hereinafter as the following specification progresses.

In the drawing:

FIGURE 1 is a fragmentary, vertical, cross-sectional view of a water supply system illustrating the corporation supply conduit, and the pipes leading to a point of use;

FIG. 2 is a side elevational view of valve-traversing pipe stopper structure embodying the concepts of the instant invention, certain parts being broken away and in section to reveal details thereof;

FIGS. 3 and 4 are cross-sectional views taken on the lines III—III, and IV—IV, respectively, of FIG. 2;

FIGS. 5 to 10 inclusive are side elevational views illustrating the various positions of the components of the instant invention during the removal and replacement of a fluid valve stop from a pressurized fluid inlet line; and FIG. 11 is a cross-sectional view taken on the line 11—11 of FIG. 2.

Apparatus for facilitating removal and replacement of fluid valve stops which are connected to pressurized inlet lines is designated generally by the numeral 10 and includes an elongated, tubular primary body 12 having a pair of longitudinally extending, externally threaded, tubular bosses 14 and 16 at opposed ends of the body 12. An outlet passage 18 through boss 14 communicates with the interior of body 12, and a bore 20 in boss 16 also communicates with body 12 and is in substantial alignment with the axis of boss 14. A plurality of operating handles 22 are secured to the outermost surface of body 12 in circumferential alignment adjacent boss 16, and a drain plug 24 normally closed by a cap 26 also communicates with the interior of body 12.

An elongated tubular element 28 is reciprocably mounted in bore 20 of boss 16, the outermost diameter of which is substantially equal to the diameter of bore 20, and an elongated rod 30 is shiftably mounted within element 28 in a manner so as to be reciprocable therein. As shown in FIG. 2 of the drawing, rod 30 is of greater length than element 28 so that the opposite ends of rod 30 extend outwardly from corresponding ends of tubular element 28. Stopper structure broadly designated by the numeral 32 is movably mounted on the end of rod 30 extending outwardly from boss 14, and structure 32 includes a pair of spaced, flexible, tubular members 34 and 36 respectively which are prevented from being removed from the outermost end of rod 30 by a lock nut 38 threadably mounted on the outermost end of rod 30. A perforated cap 40 preferably of non-corrodible metallic material is disposed on each end of each of the tubular members 34 and 36 respectively and, as seen in FIG. 4, proximal caps 40 engage each other while one of the caps engages lock nut 38 and the opposed cap 40 on member 36 engages a perforated lug nut 42 threadably mounted on the outermost end of element 28.

The outermost end 41 of rod 30 extending outwardly from boss 16 is suitably threaded and a nut 84, which is adapted to removably receive thereon for rotation therewith a valve wheel 44, is complementally threaded on end 41 of rod 30 so as to be rotatable with respect thereto. Another lock nut 46 is threaded on the outermost portion of end 41, and is removable therefrom to permit the hand wheel 44 to be selectively removed from and replaced on rod 30. A perforated cup-shaped component 48 having an opening therein of substantially equal diameter to the diameter of element 28 is threadably mounted on boss 16 and, as shown in FIG. 3, annular packing 50 is disposed in component 48 and normally abuts the outermost end of boss 16.

As shown in FIG. 1 of the drawing, apparatus 10 is especially adapted for facilitating removal and replacement of a curb stop 52 which is connected to inlet line 54 and outlet line 56. Inlet line 54 is connected to a suitable corporation supply conduit 58 which is normally located in the roadway below pavement 60, whereas valve stop 52 is in the curbway between pavement 60 and sidewalk 62. A corporation stop 64 is most usually provided in line 54 adjacent supply conduit 58 in a position where roadway 60 must be broken up in order that access may be had to corporation stop 64. Also, a vertical pipe 66 is usually provided communicating the valve handle 68 of curb stop 52 with the surface of the ground so that an elongated valve handle 70 may be moved downwardly through pipe 66 to a position engaging handle 68 so that the latter may be moved to its on and off positions.

As pointed out hereinabove, apparatus 10 is especially adapted so that curb valve stops 52 may be removed and replaced without loss of fluid from inlet line 54 and without the necessity of breaking up pavement 60 so that access may be had to corporation stop 64 to thereby stop flow of fluid through line 54, and the way in which apparatus 10 is preferably utilized is illustrated in FIGS. 5 to 10 inclusive of the drawing.

Initially, a hole is dug in the curbway between pavement 60 and sidewalk 62, which is indicated by the dotted line 72, so that the person operating apparatus 10 may have access to valve stop 52. Of note is the fact that hole 72 must normally be dug in a direction away from the inlet line 54 of curb stop 52 so that apparatus 10 may be placed in hole 72 on the outlet side of curb valve stop 52. The handle 70 is initially inserted into pipe 66 and valve handle 68 is rotated to close the valve in curb stop 52. After hole 72 has been dug, outlet line 56 is removed from the outlet passage of curb stop 52 and the body 12 is screwed into position on the outlet of valve stop 52. Means for securing body 12 to curb stop 52 may comprise an internally threaded, cup-shaped flange 74 which is threaded to complementally engage the externally exposed threads of the outlet end of valve stop 52 and which is also threaded to engage the threads of boss 14. Thus, it can be seen that boss 14 is in proximal relationship to the outlet end of valve stop 52 while boss 16 and component 48 thereon extend outwardly from valve stop 52.

After body 12 has been placed in position, handle 70 is rotated to open the valve of curb stop 52 and wheel 44 is grasped and pushed to shift element 28 and rod 30 inwardly toward valve 52. Handle 44 is thereby shifted to a position adjacent component 48 as shown in FIG. 6, and it can be appreciated that stopper structure 32 passed through valve 52 and is disposed within inlet line 54 after such shifting movement of the element 28 and rod 30. Then wheel 44 is rotated in a direction so as to move nut 84 on rod 30 in the direction of the stopper structure 32 and, by virtue of engagement of the innermost portion of wheel carrying nut 84 with the proximate end of element 28, it can be appreciated that rod 30 is caused to move relative to element 28 longitudinally of the latter. This reciprocation of rod 30 with respect to element 28 causes the lock nut 38 to move inwardly toward lug nut 42 and causes longitudinal compression of members 34 and 36 respectively. Because of their flexible nature and their tubular configuration, members 34 and 36 respectively tend to bow outwardly as shown in FIG. 4, and engage the innermost surface of inlet pipe 54 to thereby block flow of fluid through the line. Also, as clearly indicated in FIG. 4, the member 34 is longitudinally longer than member 36 and therefore, the members 34 and 36 tend to expand at different rates, the member 34 expanding faster than member 36 because the former offers less resistance to longitudinal compression than the latter. This different rate of expansion is of importance because member 34 engages the surface of line 54 before member 36 engages such surface and therefore, there is no tendency for the member 36 to be unduly abraded which would be the case if both of the members 34 and 36 respectively engaged the pipe at the same time and then would necessarily be moved toward each other upon further reciprocation of rod 30 with respect to element 28. Furthermore, because of the provision of spaced members 34 and 36 respectively which engage the innermost surface of line 54 at two different points, a better seal of fluid is effected because of the fact that the pressure between expanded members 34 and 36 is less than the pressure on the inlet side of member 36.

After the members 34 and 36 have been expanded into fluid blocking positions, lock nut 46 is removed from the end 41 of rod 30, wheel 44 is subsequently removed from nut 84, and then curb stop 52 is unscrewed from the flange 76 on line 54 and then moved off of tubular element 28 and nut 84. If desired, the tubular body 12 may initially be removed from curb stop 52 before the latter is removed from line 54 but this is entirely optional. Since stopper structure 32 completely blocks inlet passage 54, there is no escape of fluid from line 54 and a new curb stop 78 may be screwed into position on the outermost end of inlet line 54. Again, it is usually convenient to initially place tubular body 12 on the outlet end of curb stop 78 before the same is placed in position on inlet line 54, but this operation may be reversed. Subsequently, the wheel 44 and lock nut 46 are again placed on nut 84 and end 41 of rod 30, respectively, and then wheel 44 is rotated in an opposite direction from the direction heretofore described so as to cause rod 30 to reciprocate with respect to element 28 and thereby move lock nut 40 outwardly with respect to lug nut 42 and release the compression on members 34 and 36 respectively. Thereupon, the handle 44 is grasped and element 28 and rod 30 are pulled outwardly from inlet line 54 and through curb stop 78 to a position where handle 70 may be rotated to rotate the valve handle of curb stop 78 to a closed position. Upon removal of the valve body 12, the outlet line 56 may again be connected to the new curb stop 78 and thus, replacement of the stop has been completed without any substantial loss of fluid from inlet line 54.

Of further note is the fact that after stopper structure 32 has been expanded to a position blocking flow of fluid through line 54, it is usually desirable to remove the cap 26 from plug 24 to ascertain whether complete stoppage of water through line 54 has been effected. If any water escapes through plug 24 it is but necessary to rotate wheel 44 a few times to cause members 34 and 36 respectively to engage the innermost surface of pipe 54 in tighter relationship. Then cap 26 is again placed in position over plug 24 to prevent loss of fluid therethrough.

Although apparatus 10 has been described as particularly adapted for replacement of curb stops 52 which are connected in water conduit systems, it is manifest that the apparatus may be utilized for other types of valves which are connected to pressurized fluid lines.

Having thus described the invention what is claimed as new and desired to be secured by Letters Patent is:

In apparatus for facilitating replacement of a fluid valve stop while the inlet line thereto remains under pressure, an elongated tubular element; an elongated rod of greater length than said element reciprocably carried by the latter whereby the outermost ends of the rod extend outwardly from corresponding ends of the element; a lock nut on one of the outermost ends of the rod; a pair of stoppers shiftably mounted on said one end of the rod between the lock nut and the proximal end of the element, said stoppers being adapted to be moved through the valve stop into the inlet line upon shifting of the rod and element in that direction, each of said stoppers including an elongated, flexible tubular member which expands upon longitudinal compression thereof, said stoppers having rigid members engaging each stopper end face so that the stoppers are subjected to compressive force across their entire cross-sectional area, the stopper adjacent the end of the tubular element being of greater axial length than the outer-most stopper so that upon compression of the stopper members the longer stopper member will expand outwardly and engage the inlet line inner surface during the initial rod movement and before the outermost stopper member engages the inlet line inner surface, the opopsite end of the rod being threaded; a take-up nut complementally threaded on said opposite end of the rod and normally disposed externally of the valve stop when the stoppers are in said inlet line whereby upon rotation of the take-up nut in one direction, the latter engages the proximal end of the element and pulls the lock nut toward said one end of the element and compresses the members longitudinally thereof thereby expanding the same to stop the flow of fluid through the line and permit removal and replacement of the valve stop without substantial loss of fluid.

References Cited in the file of this patent
UNITED STATES PATENTS

| | | |
|---|---|---|
| 543,745 | Meyer | July 30, 1895 |
| 2,299,365 | Valuch | Oct. 20, 1942 |
| 2,462,748 | Johnson | Feb. 22, 1949 |
| 2,690,612 | Scott | Oct. 5, 1954 |
| 2,808,889 | Morrisett et al. | Oct. 8, 1957 |